United States Patent [19]

Earl et al.

[11] 4,405,762

[45] Sep. 20, 1983

[54] PREPARATION OF HYDROXY-TERMINATED POLY(3,3-BISAZIDOMETHYLOXETANES)

[75] Inventors: Robert A. Earl; James S. Elmslie, both of Salt Lake City, Utah

[73] Assignee: Hercules Incorporated, Wilmington, Del.

[21] Appl. No.: 327,825

[22] Filed: Dec. 7, 1981

[51] Int. Cl.³ .................... C08G 65/22; C08G 65/32
[52] U.S. Cl. .................................. 525/410; 528/408; 528/409; 528/416; 528/417; 149/109.4; 149/122
[58] Field of Search ............... 525/410; 528/408, 409, 528/416, 417

[56] References Cited

U.S. PATENT DOCUMENTS

| | | | |
|---|---|---|---|
| 3,645,917 | 2/1972 | Vandenberg | 260/2 A |
| 3,694,383 | 9/1972 | Azami et al. | 260/2 XA |
| 4,268,450 | 5/1981 | Frankel et al. | 260/349 |
| 4,303,414 | 12/1981 | Frankel et al. | 44/63 |

Primary Examiner—Earl A. Nielsen
Attorney, Agent, or Firm—E. C. Ross, Jr.

[57] ABSTRACT

Polymerizing 3,3-bischloromethyloxetane to yield halomethyl polymer products having hydroxy functionality and a molecular weight between about 500–15,000 followed by reacting such products with metal azide provides poly(azidomethyloxetanes) particularly useful as energetic binders for explosives, gas generators and gun and rocket propellants. Polyhydric initiators are used in the polymerization step.

22 Claims, No Drawings

PREPARATION OF HYDROXY-TERMINATED POLY(3,3-BISAZIDOMETHYLOXETANES)

BACKGROUND OF THE INVENTION

1. Field of Use

This invention relates to making highly energetic polymers suitable as binders for explosives, gas generators, and gun and rocket propellants. This invention, more particularly, relates to preparation of hydroxy-terminated poly(azidomethyloxetane) homopolymers and copolymers and, even still more particularly, to a method of making these polymers using poly(3,3-bishalomethyloxetanes) made from 3,3-bis(halomethyl)oxetane monomers.

2. Prior Art

Poly(bisazidomethyloxetanes) of low molecular weight can be made by polymerization of 3,3-bisazidomethyloxetane. This polymerization, however, is potentially hazardous because 3,3-bisazidomethyloxetane is explosive. It would be desirable, therefore, if an alternative route for preparation of these poly(bisazidomethyloxetanes) could be devised.

Certain high molecular weight poly(bischloromethyloxetanes) are known and have been converted to poly(azidomethyloxetanes). (See, for example, U.S. Pat. No. 3,694,383.)

OBJECTS OF THE INVENTION

It is an object of this invention to provide a method of making hydroxy-terminated poly(azidomethyloxetanes) which reduces the hazard associated with the prior art process discussed above.

It is an object of this invention to provide such a method in which resulting hydroxy-terminated poly(azidomethyloxetanes) are suitable for use as binders in explosives, gas generators, gun and rocket propellants as well as have potential in other areas such as in light sensitive coatings.

These and other objects of this invention can be accomplished as will be apparent from the following disclosure.

SUMMARY OF THE INVENTION

Hydroxy-terminated poly(azidomethyloxetanes) of this invention are prepared by (a) reacting (i) a 3,3-bishalomethyloxetane with (ii) a polyhydric initiator at a molar ratio of (i) to (ii) of at least about 3:1 in the presence of a strong or Lewis acid catalyst at a polymerization temperature to yield a halomethyl polymer product having a molecular weight between about 500 and 15,000 and a hydroxy number above about 1.5; and (b) contacting the halomethyl polymer product and a metal azide at an elevated temperature for a time sufficient to displace at least a portion of the halide groups of the halomethyl polymer product with azido groups forming the hydroxy-terminated poly(azidomethyloxetane) of this invention.

Other polymerizable monomers that are also copolymerizable with 3,3-bishalomethyloxetane can be employed to replace up to half of the 3,3-bishalomethyloxetane in making poly(azidomethyloxetane) copolymers of this invention.

DETAILED DESCRIPTION OF THE INVENTION

The first step in practicing the process of this invention for preparation of poly(azidomethyloxetanes) comprises reacting a 3,3-bishalomethyloxetane of the formula:

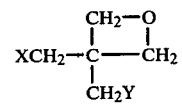

wherein X and Y are independently the same or a different halogen such as chlorine or bromine, and a polyhydric initiator in the presence of a catalyst. The polyhydric initiator preferably is an organic polyhydric compound, particularly a polyhydric alcohol having two, three or more primary, secondary or primary and secondary hydroxy groups. Examples of suitable polyhydric compounds include ethylene glycol; 1,2-dihydroxypropane; 1,2,3-trihydroxypropane (glycerol); 1,3-propane diol; 1,4-butanediol and other higher alkyl diols; 2,2-bis(chloromethyl) propane-1,3-diol; 2,2-dinitropropane-1,3-diol; 1,1,1-trishydroxymethylethane, pentaerythritol. Mixtures of these polyhydric compounds also can be employed as the hydroxy functional initiator.

The molar ratio of the 3,3-bishalomethyloxetane to the polyhydric initiator is at least about 3:1, more desirably at least about 5:1 to 200:1 with a preferred range between about 10:1 to 50:1. Generally, the higher the ratio of the 3,3-bishalomethyloxetane to the polyhydric initiator, the higher the molecular weight of the halomethyl polymer product.

Polymerization of the 3,3-bishalomethyloxetane in step (a) occurs in the presence of a strong acid or a Lewis acid catalyst. Catalysts which preferably are employed include the Friedal-Crafts catalysts such as a boron trifluoride or its etherate. The boron trifluoride catalyst is used at catalytic levels in amounts from about 0.1 to 2 times the number of equivalents of the polyhydric initiator employed. Water may be present as a co-catalyst at similar or less amounts.

The 3,3-bishalomethyloxetane is combined with the aforedescribed catalyst and polyhydric initiator in a suitable liquid media. Other monomers, as aforedescribed, may be added before, after or with the 3,3-bishalomethyloxetane. The liquid reaction media is selected in quantity and type to facilitate contact between the reactants, mediate reaction progress and the like, as desired. Ordinary solvents may be used as the liquid media to give a halomethyl polymer product of step (a) that has a molecular weight of between about 500 and 15,000 (number average). A variety of polar and nonpolar solvents and diluents can be used, examples of which include halogenated solvents such as methylchloride; 1,2-dichloroethane; chloroform; chlorobenzene; and methylenechloride. Other solvents include non-halogenated solvents such as benzene, toluene and the xylenes.

The temperature is selected to bring about polymerization of the 3,3-bishalomethyloxetane. Generally, this temperature is within a range between about $-70°$ C. to about 150° C., or more, preferably from about $-20°$ C. to about 50° C. Normally, the higher the temperature, the lower molecular weight of the halomethyl polymer product of step (a).

If desired, a portion of the 3,3-bishalomethyloxetanes may be replaced with another monomer or monomers copolymerizable with the 3,3-bishalomethyloxetane. Up to about 50 mole percent of the 3,3-bishalomethyloxetanes may be replaced with the copolymerizable monomer. Among suitable monomers that can be employed are cyclic ethers such as oxiranes, other oxetanes and tetrahydrofurans. Exemplary oxiranes include alkylene oxides having up to 20 carbons such as ethylene oxide, propylene oxide, cis- and trans-butene-2,3-oxide; cycloaliphatic epoxides containing 6 to 12 carbons such as cyclohexene oxide; aryl alkylene oxides such as styrene oxide; saturated glycidyl ethers such as methyl or ethyl or phenyl glycidyl ether; ethylenically unsaturated epoxides such as allyl glycidyl ether, the mono-epoxides of dienes or polyenes, the glycidyl esters of ethylenically unsaturated acids, and halogen containing derivatives of any of these such as epichlorohydrin, 2-chloro-3,4-epoxy butane, 1,4-dichlorobutene-2,3-oxides, 4-chloro-1,2-epoxybutane, 2-chloro-4,5-epoxypentane. Exemplary other oxetanes include 2,2-bishalooxetanes, 2-chlorooxetane and 3-bromooxetane. Exemplary hydrofurans include tetrahydrofuran, 2-, and 3-methyl tetrahydrofuran, and 2,3-dimethyltetrahydrofuran or halo or halomethyltetra hydrofuran.

The halomethyl polymer product of step (a), as above described, is washed to remove the acid catalyst. The halomethyl polymer product is then suspended or dissolved in a liquid such as dimethylsulfoxide (DMSO) for reaction with dissolved or suspended metal azide at elevated temperature. Reaction that takes place in an inert atmosphere in absence of light protects azido groups as well as the polymer chain.

The precise conditions under which the metal azide (preferably an alkali metal azide such as sodium azide) and the halomethyl polymer product of step (a) are reacted depend upon the desired degree of conversion, rate of reaction, nature of the reactants and the like. Generally, the desired stoiciometric amounts or higher of the metal azide are reacted with the halomethyl polymer product at temperatures between about 50°–150° C., more preferably 50°–125° C., for times varying from minutes to many hours or days. The reaction is carried out preferably in a solvent for the halomethyl polymer product such as DMSO, as previously mentioned, which also dissolves the metal azide sufficiently for desired reaction rates. Among other suitable solvents are dimethylformamide, dimethylacetamide, hexamethylphosphoramide, N-methylpyrrolidone, dioxane, tetrahydrofuran, dimethylether of diethylene glycol, acetone, water or combinations thereof. Liquids which are not solvents for the halogen polymer product may also be used, e.g., aliphatic and aromatic hydrocarbons and halogenated products of these.

The reaction of step (b) is continued until a desired amount of the halogen groups of the halomethyl polymer product of step (a) is displaced by azido groups from the metal azide. When the poly(azidomethyloxetanes) of this invention are used for applications such as crosslinkable binder components for explosives, gas generators, and gun and rocket propellants, at least about 50%, more preferably at least about 98%, of the total number of halogen groups of the halomethyl polymer product are displaced by azido groups. Advantageously, the reaction of step (b) can be carried out so that there is no readily apparent chain degradation. Thus, when the reaction of step (b) is carried on until detectable halogen in the resulting polymer product is absent, there is about an eight (8) percent molecular weight increase from the halomethyl polymer product of step (a) to the poly(3,3-bisazidomethyloxetane) resulting from step (b).

The product of step (b) may be isolated in a conventional manner such as by evaportion of the liquid media or by precipitation of the product under mild conditions.

The poly(azidomethyloxetanes) of the invention when used as binders are combined with solid ingredients and/or plasticizer in the presence of a polyfunctional isocyanate. A catalyst such as triphenylbismuth or a tin catalyst may be included. Reaction between the hydroxy groups of the poly(azidomethyloxetanes) of this invention and the isocyanate groups effects crosslinking. Gun propellants as well as strategic and tactical rocket propellants use this crosslinking to form a rubbery matrix. A desirable molecular weight range for these applications includes a molecular weight between about 800 and 5000 (number average). Generally a functionality of 2 or greater (e.g. 2 to 3) is desirable for the poly(azidomethyloxetanes); however, cures may be achieved by using isocyanates with higher functionality in the cases where the poly(azidomethyloxetanes) of this invention has hydroxy functionality less than 2.

The halomethyl polymer product of step (a) is also useful, e.g. as a lubricant additive or a crosslinkable binder.

As used herein and in the appended claims the term "hydroxy number" means the number of hydroxy groups per mole determined for a polymer by GPC (i.e. gel permeation chromatography). Also as used herein and in the appended claims, molecular weight refers to molecular weights determined by GPC (i.e. gel permeation chromatography), unless specifically noted otherwise.

The following examples illustrate this invention but are not intended as limiting thereof; those skilled in the art will recognize that many modifications of these examples may be made within the true scope of this invention. All parts and percentages are parts and percentages by weight, unless specifically noted otherwise. Likewise, temperatures are in degrees centigrade (°C.), unless specifically noted otherwise.

EXAMPLES

Melting points were determined with a Mel-Temp capillary melting point apparatus and are uncorrected. The $^{13}$CMR and $^1$H n.m.r. spectra were recorded on a Varian CFT-20 NMR spectrometer using CDCl$_3$ as solvent with tetramethylsilane as internal standard. Infrared were recorded on a Perkin Elmer 421 grating spectrophotometer and are expressed in reciprocal centimeters $(cm^{-1})$. 3,3-Bis(chloromethyl)oxetane was redistilled and was of 99+% purity as determined by GC. Boron trifluoride etherate (BF$_3$.OEt$_2$) was redistilled and stored under nitrogen at $-15°$ C. Dimethyl sulfoxide and methylene chloride were reagent grade and were stored over 3 Angstrom molecular sieves. Sodium azide was reagent grade (99+%) and was dried for 10 hours at 100° C. and 0.5 torr.

Preparation of 2,2-bis(chloromethyl)propane-1,3-diol 3,3-Bis(chloromethyl)oxetane(BCMO, 15.5 g, 0.1 mole) was added, dropwise, to a stirred, refluxing solution of 0.5 ml of concentrated sulfuric acid in 60 ml of water. The mixture was stirred under reflux for 18 hours. The mixture was cooled to 25° and then sodium carbonate (3 g) was added. When gas evolution had ceased, the mixture was extracted with ethylacetate (3×40 ml). The combined ethylacetate extracts were washed in succession with water (40 ml) and saturated sodium chloride solution (40 ml). After drying (anhydrous sodium sulfate), the solution was concentrated, in vacuo, to remove solvent. The oily, solid residue was then washed with n-heptane-methylene chloride (40 ml, 1:1, v/v) and the crystals collected by filtration. Recrystallization from small amounts of methanol gave pure 2,2-bis(chloromethyl)propane-1,3-diol, 10.8 g (69.7%), mp,75.5°-78.5° (Lit[a]mp,81°). $^{13}$C n.m.r. (PPM): 44.94(s,$\underline{C}H_2Cl$); 46.62(s, $\underline{C}(CH_2-)_4$); 61.51 (s, $CH_2\underline{O}H$).

[a] A. Mooradian and J. B. Cloke, J. Amer. Chem. Soc., 67, 942 (1945).

Preparation of Hydroxy-terminated poly(3,3-bischloromethyloxetanes)

TABLE 1 summarizes conditions used for these preparations. The detailed procedure from Run 1, which follows, is representative. Boron trifluoride etherate (BF$_3$ OET$_2$, 2.85 g, 20.1 mmoles) and water (181 mg, 10.05 mmoles) were added to dry methylene chloride (80 ml) and the suspension stirred for 15 minutes. Then 1,1,1-trishydroxymethylpropane (THMP, 899 mg, 6.7 mmoles) was added and the mixture stirred another 10 minutes. 3,3-Bis(chloromethyl)oxetane (15.5 g, 0.1 mole) was then added in one portion and the mixture stirred 18 hours at 25°. Concentrated ammonium hydroxide (5 ml) was added and the methylene chloride was removed in vacuo. The residual white polymer was washed in succession with methanol-water (1:1, v/v, 3×50 ml) and then methanol (50 ml). The polymer (white powder) was dried in vacuo to yield 12.8 g (78%) of product. $^1$H n.m.r. (δ): 0.85 (t, CH$_3$); 1.25 (m, CH$_2$) 3.50 (m, CH$_2$Cl); 3.55 (m, CH$_2$O) I.r.: 3440 (OH); 733, 698 (C—Cl). The molecular weight (GPC) was 1000 and the hydroxy equivalent weight (HEW) was determined to be 400 giving a functionality of 2.5 OH groups/molecule.

Preparation of Hydroxy-Terminated Poly(3,3-bisazidomethyloxetane) (Poly BAMO)

Dry nitrogen was bubbled through a stirred suspension of poly(3,3-bischloromethyloxetane) (31 g, 0.2 mole, equivalent weight=597, prepared using the procedure of Run 4, TABLE 1) in 120 ml of DMSO for 1 hr. The stirred mixture was then heated to 115° while nitrogen purging was continued (the polymer was completely dissolved at 105°) and then sodium azide (33.8 g, 0.52 mole) was added and the mixture stirred at 115° for 4 days. At the end of the 4 days, the mixture was cooled to room temperature and then 1,1,1-trichloroethane (200 ml) was added. The mixture was washed in succession with water (3×100 ml) followed by one-half saturated aqueous sodium chloride solution. The solution was filtered through phase separating filter paper. Solvent was removed, in vacuo, and last traces of moisture were removed by concentration, in vacuo, for one hour at 70° and 0.5 torr. The clear, pale yellow polymer crystallized to a waxy solid on cooling to room temperature; yield, 29.1 g (86%). Quantitative azide group analysis[b] (gasometric) gave 32.9% N$_2$ (Anal. calcd 33.3%). The equivalent weight was found to be 650 g/mole. $^{13}$C n.m.r. (ppm): 45.39 (s, $\underline{C}(CH_2-)_4$); 52.05 (m, $\underline{C}H_2N_3$); 62.67 (s, $\underline{C}H_2OH$); 70.46 (m, $\underline{C}H_2O$). The $^{13}$C n.m.r. spectrum contained no peaks which could be assigned to chloromethyl groups, confirming that complete displacement of chloride by azide had occured. I.r. (cm$^{-1}$): 3440 (OH); 2100 (N$_3$). No absorptions at 698 and 733 cm$^{-1}$ were noted in the i.r. spectrum for chloride. Sensitivity to impact (2 Kg weight): 17 cm.

[b] W. R. Carpenter, Anal. Chem., 36. 2352 (1964).

TABLE I

| | PREPARATION OF HYDROXY-TERMINATED Poly (BIS-3,3-CHLOROMETHYLOXETANE) | | | | | | | |
|---|---|---|---|---|---|---|---|---|
| RUN NO. | BCMO g (mmoles) | ALCOHOL[a] g (mEq) | BF$_3$OEt$_2$ g (mmoles) | H$_2$O g (mmoles) | POLYMER Yield (%) | Mw[b] | HEW[b] | FUNCTIONALITY |
| 1 | 15.5 (100) | THMP 0.9 (20.1) | 2.85 (20.1) | 0.181 (10.05) | 78 | 1000 | 400 | 2.5 |
| 2 | 1.55 (10) | THMP 0.090 (2.01) | 0.285 (2.01) | 0.036 (2.00) | 21.3 | 800 | 280 | 2.9 |
| 3 | 10.0 (64.5) | DEG 0.69 (13.0) | 1.84 (13.0) | 0.117 (6.5) | 33.7 | 1260 | 705 | 1.8 |
| 4 | 10.0 (64.5) | EG 0.40 (13.0) | 1.84 (13.0) | 0.117 (6.5) | 45 | 1023 | 555 | 1.8 |
| 5 | 10.0 (64.5) | BCMPD 1.1 (13.0) | 1.84 (13.0) | 0.117 (6.5) | 80.9 | 1648 | 755 | 2.2 |
| 6 | 10.0 (64.5) | BCMPD 1.1 (13.0) | 1.84 (13.0) | 0.0 | 90.0 | 1560[c] | — | — |
| 7 | 10.0 (64.5) | BCMPD 1.1 (13.0) | 1.84 (13.0) | 0.059 (3.25) | 96.0 | 1860[c] | — | — |

[a]THMP = 1,1,1-trishydroxymethylpropane; DEG = diethylene glycol; EG = ethylene glycol; BCMPD = 2,2-bis(chloromethyl)propane-1,3-diol.
[b]Molecular weights (Mw) and Hydroxy equivalent weights (HEW) were determined using GPC (gel permeation chromatography) with polystyrene as molecular weight standard.
[c]Some of the polymer was insoluble in the solvent (THF) used for GPC analysis and HEW's were not determined.

The results of runs 1-7 indicate that too much cocatalyst (water) can reduce yield. Also, the yields are dependent on the nature of the initiator. The chloromethyl polymer products have a higher molecular weight when using little or no cocatalyst (water) as seen in runs 6 and 7, respectively, but also have a broader molecular weight distribution.

What is claimed is:

1. A method of making a hydroxy terminated poly(azidomethyloxetane), which comprises:
   (a) reacting (i) a 3,3-bishalomethyloxetane with (ii) a polyhydric initiator at a molar ratio of (i) to (ii) of at least about 3:1 in the presence of a strong or Lewis acid catalyst at a polymerization temperature to produce a halomethyl polymer product having a molecular weight between about 500 and 15,000 and a hydroxy number above about 1.5; and
   (b) contacting the halomethyl polymer product of (a) and a metal azide at an elevated temperature for a time sufficient to displace a portion of the halide groups of the halomethyl polymer product with azido groups.

2. The method in accordance with claim 1, wherein said 3,3-bishalomethyloxetane comprise 3,3-bischloromethyloxetane.

3. A method in accordance with claim 2, wherein said polyhydric initiator comprises an aliphatic diol or triol.

4. A method in accordance with claim 3, wherein said molar ratio is between about 10:1 to about 50:1.

5. A method in accordance with claim 4, wherein said temperature is between about −20° C. and 50° C.

6. A method in accordance with claim 1, 2, 3, 4 or 5, wherein water is included as a co-catalyst in step (a).

7. A method in accordance with claim 6, wherein said metal azide comprises sodium azide.

8. A method in accordance with claims 1, 2, 3, 4 or 5, wherein said metal azide comprises sodium azide.

9. A method in accordance with claim 8, wherein said hydroxy initiator comprises a polyhydric alcohol selected from the group consisting of 1,1,1-trishydroxymethylpropane; diethylene glycol; ethylene glycol; and 2,2-bis(halomethyl)-1,3-diol.

10. A method of making a hydroxy terminated poly(3,3-bisazidomethyloxetane), which comprises:
   (a) reacting (1) a 3,3-bischloromethyl oxetane with (ii) a polyhydric alcohol at a molar ratio of (i) to (ii) of at least about 3:1 in the presence of a strong or Lewis acid catalyst at a polymerization temperature to produce a chloromethyl polymer product having a molecular weight between about 500 and 15,000 and a hydroxy number above about 1.5; and
   (b) reacting the chloromethyl polymer product and a metal azide at an elevated temperature for a time sufficient to displace essentially all of the chloride groups of the chloromethyl polymer product with azido groups to provide the hydroxy-terminated poly(3,3-bisazidomethyloxetane).

11. A method in accordance with claim 10, wherein said ratio is between about 10:1 to 50:1.

12. A method in accordance with claim 11, wherein said metal azide comprises sodium azide.

13. A method in accordance with claim 12, wherein said catalyst comprises a boron trifluoride alkyl etherate and water is included as a cocatalyst.

14. A method in accordance with claims 10, 11, 12 or 13, wherein the hydroxy-terminated poly(3,3-bisazidomethyloxetane) has a molecular weight between about 800 and about 5,000.

15. A method in accordance with claim 14, wherein said polyhydric initiator comprises an alcohol selected from the group consisting of 1,1,1-trishydroxymethylpropane; diethylene glycol; ethylene glycol; and 2,2-bis(halomethyl)-1,3-diol.

16. A method of making a hydroxy-terminated poly(azidomethyloxetane), which comprises:
   (a) reacting (i) a 3,3-bishalomethyloxetane, a polymerizable monomer copolymerizable therewith and (ii) a polyhydric initiator at a molar ratio of (i) to (ii) of at least about 3:1 in the presence of a strong or Lewis acid catalyst at a polymerization temperature to produce a halomethyl copolymer product having a molecular weight between about 500 and 15,000 and a hydroxy number above about 1.5; and
   (b) contacting the halomethyl copolymer product and a metal azide at an elevated temperature for a time sufficient to displace a portion of the halide groups of the copolymer product with azido groups.

17. A method in accordance with claim 16, wherein said metal azide comprises sodium azide.

18. A method in accordance with claim 17, wherein said ratio is between about 10:1 and about 200:1.

19. A method in accordance with claim 18, wherein the molecular weight of the copolymer product of step (b) is between about 800 to about 5000.

20. A method in accordance with claim 19, wherein said 3,3-bishalomethyloxetane comprises 3,3-bischloromethyloxetane.

21. A method in accordance with claim 20, wherein said catalyst comprises a boron trifluoride and said temperature is between about −20° C. and 50° C.

22. A method in accordance with claim 16, wherein the halomethyl copolymer product of (a) has a hydroxy number between 2 and 3.

* * * * *